United States Patent
Rogers et al.

(10) Patent No.: US 8,174,988 B1
(45) Date of Patent: May 8, 2012

(54) QUALITY-OF-SERVICE CONTROL ON A WIRELESS COMMUNICATION DEVICE THAT CONTROLS THE COMMUNICATION PATHS USED BY A COMMUNICATION NETWORK

(75) Inventors: Frederick C. Rogers, Olathe, KS (US); Lyle T. Bertz, Lee's Summit, MO (US)

(73) Assignee: Sprint Communications Company L.P., Overland Park, KS (US)

(*) Notice: Subject to any disclaimer, the term of this patent is extended or adjusted under 35 U.S.C. 154(b) by 1081 days.

(21) Appl. No.: 12/033,124

(22) Filed: Feb. 19, 2008

(51) Int. Cl.
*H04J 3/14* (2006.01)

(52) U.S. Cl. ............... 370/237; 370/439

(58) Field of Classification Search .......... 370/229, 370/437, 232; 709/231; 455/432
See application file for complete search history.

(56) References Cited

U.S. PATENT DOCUMENTS

| 6,081,522 A | 6/2000 | Hendel et al. |
|---|---|---|
| 2005/0204052 A1* | 9/2005 | Wang et al. ............ 709/231 |
| 2006/0250965 A1* | 11/2006 | Irwin .................... 370/238 |
| 2008/0133751 A1* | 6/2008 | Lei et al. ............... 709/224 |
| 2009/0318164 A1* | 12/2009 | Kee ...................... 455/456.1 |

* cited by examiner

*Primary Examiner* — Seema S Rao
*Assistant Examiner* — Henry Baron

(57) ABSTRACT

A wireless communication device receives a media request from a user and transfers a message to a media server. The media server receives the message, and in response, transfers media to the wireless device in a first set of packets that have a first sequence of packet addresses. The wireless device receives the first set of packets and displays the media. The wireless device displays a QoS control and receives a QoS level from the user, and in response, transfers a message indicating the QoS level to the media server. The media server receives the message, and in response, translates the QoS level into a second sequence of packet addresses and transfers the media to the wireless device in a second set of packets that each have the second sequence of packet addresses. The wireless communication device receives the second set of packets and displays the media.

16 Claims, 7 Drawing Sheets

| QoS | ADDRESS SEQUENCE |
|---|---|
| 1 | A – E – F – G – H |
| 2 | A – B – C – H |
| 3 | A – D – H |
| ... | ... |
| N | A – H |

FIGURE 6

QUALITY-OF-SERVICE CONTROL ON A WIRELESS COMMUNICATION DEVICE THAT CONTROLS THE COMMUNICATION PATHS USED BY A COMMUNICATION NETWORK

TECHNICAL BACKGROUND

In the field of communications, Quality-of-Service (QoS) is used to characterize the user's communication experience. Good QoS characterizes a positive user experience where all communications arrive on time and are uncorrupted. Poor QoS characterizes a negative user experience where some communications arrive late or corrupted. QoS is controlled by the communication resources that the communication system allocates to the user. These communication resources include the communication links and equipment that make up the communication path. For example, a congested communication path typically provides poor QoS when compared to a lightly loaded communication path. In addition, a communication path with several intermediate processing nodes provides poor QoS when compared to a communication path with fewer processing nodes. Many other factors affect QoS, such as the speed of the communication links or the processing capacity of the nodes.

Communication systems typically allow a user to specify a QoS when they request a communication service. In some cases, the user may desire to pay more for high QoS that is provided by premium network nodes and links. In other cases, the user may desire to pay less for lower but adequate QoS that is provided by cheaper network nodes and links.

The ability of the user to control QoS during a communication session is limited. In some cases, the communication network may detect a problem during the session and reroute user traffic to improve poor QoS. In other cases, the user may terminate a communication session with poor QoS and request a new communication session with higher QoS. This is not an effective technique for allowing the users in a communication session to conveniently and dynamically control QoS during the session.

OVERVIEW

A wireless communication device receives a media request from a user and transfers a message to a media server. The media server receives the message, and in response, transfers media to the wireless device in a first set of packets that have a first sequence of packet addresses. The wireless device receives the first set of packets and displays the media. The wireless device displays a QoS control and receives a QoS level from the user, and in response, transfers a message indicating the QoS level to the media server. The media server receives the message, and in response, translates the QoS level into a second sequence of packet addresses and transfers the media to the wireless device in a second set of packets that each have the second sequence of packet addresses. The wireless communication device receives the second set of packets and displays the media.

BRIEF DESCRIPTION OF THE DRAWINGS

FIG. 6 is a table diagram that illustrates the correlation between user-specified QoS levels and sequences of packet addresses.

DETAILED DESCRIPTION

Figure 1:
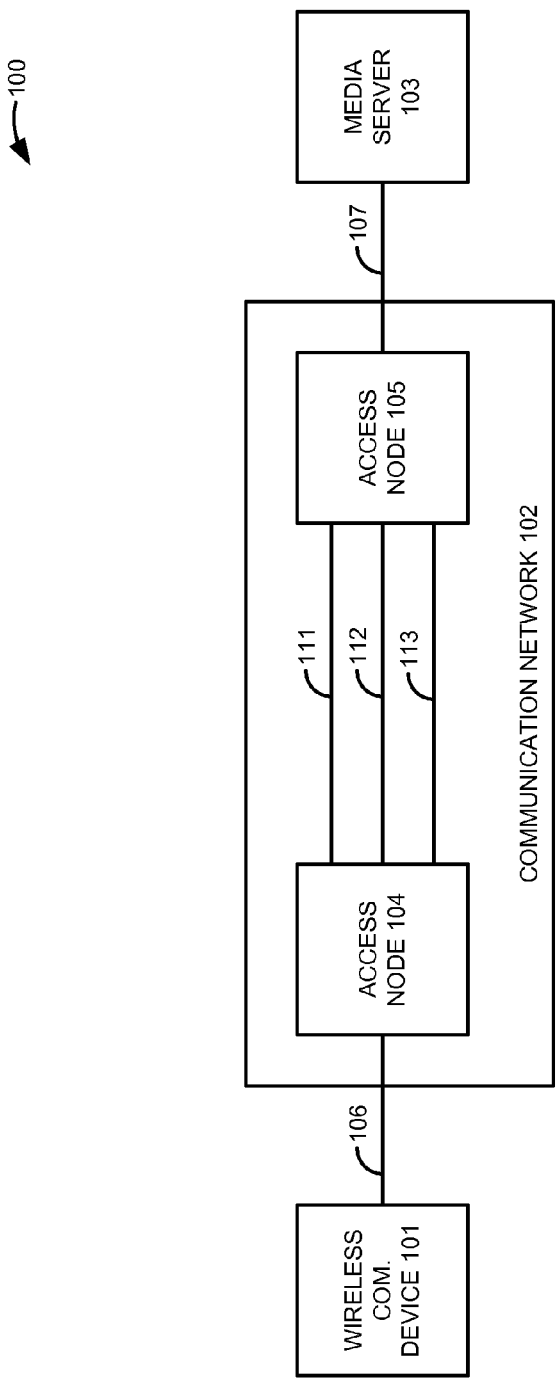
FIG. 1 is a block diagram that illustrates a communication system.

FIG. 1 is a block diagram that illustrates communication system 100. Communication system 100 comprises wireless communication device 101, communication network 102, and media server 103. Communication network 102 comprises access nodes 104-105 and communication paths 111-113. Wireless communication device 101 and access node 104 wirelessly communicate over wireless communication link 106. Media server 103 and access node 105 communicate over communication link 107. Access nodes 104-105 communicate over communication paths 111-113.

Wireless communication device 101 comprises a telephone, transceiver, computer, digital assistant, Internet appliance, or some other wireless communication apparatus—including combinations thereof. Wireless communication device 101 requests and receives media from media server 103, and then displays the media to the user. The media comprises video, audio, graphics, or some other form of digital content. Wireless communication device 101 also displays a Quality-of-Service (QoS) control that allows the user to conveniently specify a QoS level.

Communication network 102 comprises wireless access points, internet routers, network gateways, computer systems, communication links, or some other type of communication equipment—including combinations thereof. Communication network 102 may comprise a single service provider or may comprise multiple service providers. Communication paths 111-113 are comprised of different nodes and links that provide different QoS for user communications.

Communication paths 111-113 use various communication media, such as air, metal, optical fiber, or some other signal propagation path—including combinations thereof. Communication paths 111-113 use various protocols, such as internet, telephony, optical networking, wireless communication, wireless fidelity, code division multiple access, worldwide interoperability for microwave access, or some other communication format—including combinations thereof. Communication paths 111-113 could be direct links or they might include various intermediate components, systems, and networks. In some examples, communication path 111 is a terrestrial path that comprises wireless links, communication path 112 is a terrestrial path that comprises landline links, and communication path 113 is an extra-terrestrial path that comprises satellite links.

Media server 103 comprises a computer system that stores and transfers media. For example, media server 103 could be an on-demand movie server. Media server 103 transfers the media using the QoS level specified by the user. In particular, media server 103 addresses the media based on the QoS level, and in response, communication network 102 delivers the media to wireless communication device 101 over a communication path based on the addressing to provide the QoS level specified by the user.

Wireless link 106 uses the air as the transport media. Wireless link 106 could use various protocols, such as wireless fidelity, code division multiple access, worldwide interoperability for microwave access, internet, telephony, or some other communication format—including combinations thereof. Communication link 107 uses various communication media, such as air, metal, optical fiber, or some other signal propagation path—including combinations thereof. Communication link 107 uses various protocols, such as internet, telephony, optical networking, wireless communication, wireless fidelity, code division multiple access, worldwide interoperability for microwave access, or some other communication format—including combinations thereof.

Figure 2:
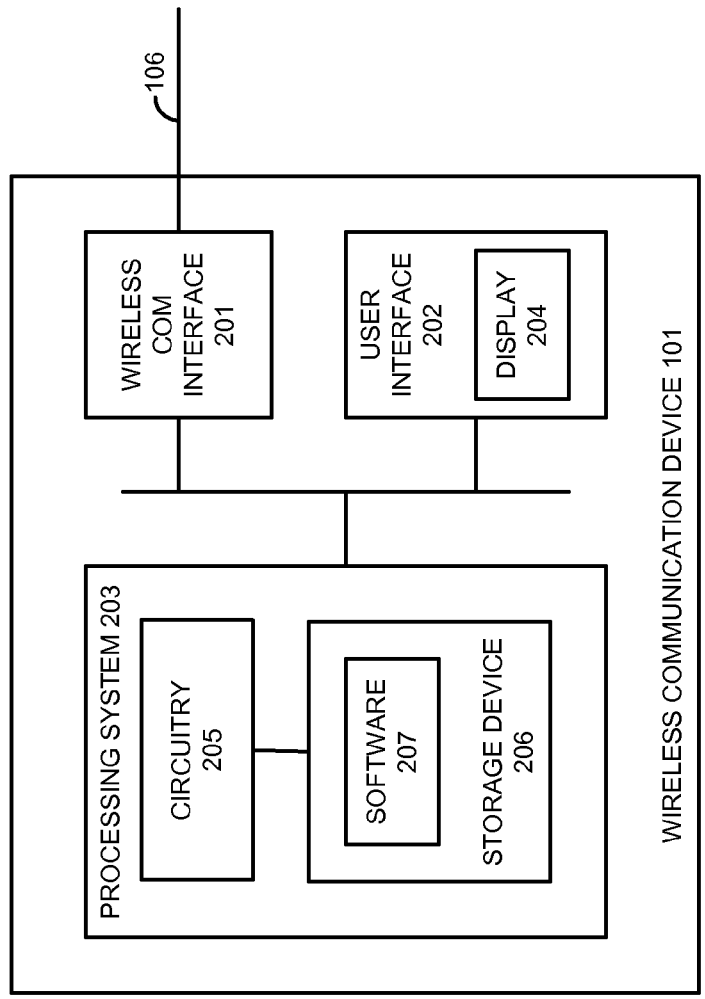
FIG. 2 is a block diagram that illustrates a wireless communication device.

FIG. 2 is a block diagram that illustrates wireless communication device 101. Wireless communication device 101 comprises wireless communication interface 201, user interface 202, and processing system 203. Processing system 203 is linked to wireless communication interface 201 and user interface 202. User interface 202 includes display 204. Processing system 203 includes circuitry 205 and storage device 206 that stores operating software 207.

Wireless communication interface 201 comprises components that communicate over wireless link 106 under the control of processing system 203. Wireless communication interface 201 comprises a wireless transceiver and antenna or some other wireless communication devices. User interface 202 comprises components that interact with the user under the control of processing system 203. In addition to display 204, user interface 202 may include a speaker, microphone, buttons, lights, touch pad, scroll wheel, or some other user input/output apparatus. Circuitry 205 comprises microprocessor and other circuitry that retrieves and executes operating software 207 from storage device 206 to control wireless communication interface 201 and user interface 202. Storage device 206 comprises a disk drive, flash drive, memory circuitry, or some other memory device.

Operating software 207 comprises computer programs, firmware, or some other form of machine-readable processing instructions. Operating software 207 may include an operating system, utilities, drivers, network interfaces, applications, or some other type of software. When executed by circuitry 205, operating software 207 directs processing system 203 to operate wireless communication device 101 as described herein.

Figure 3:
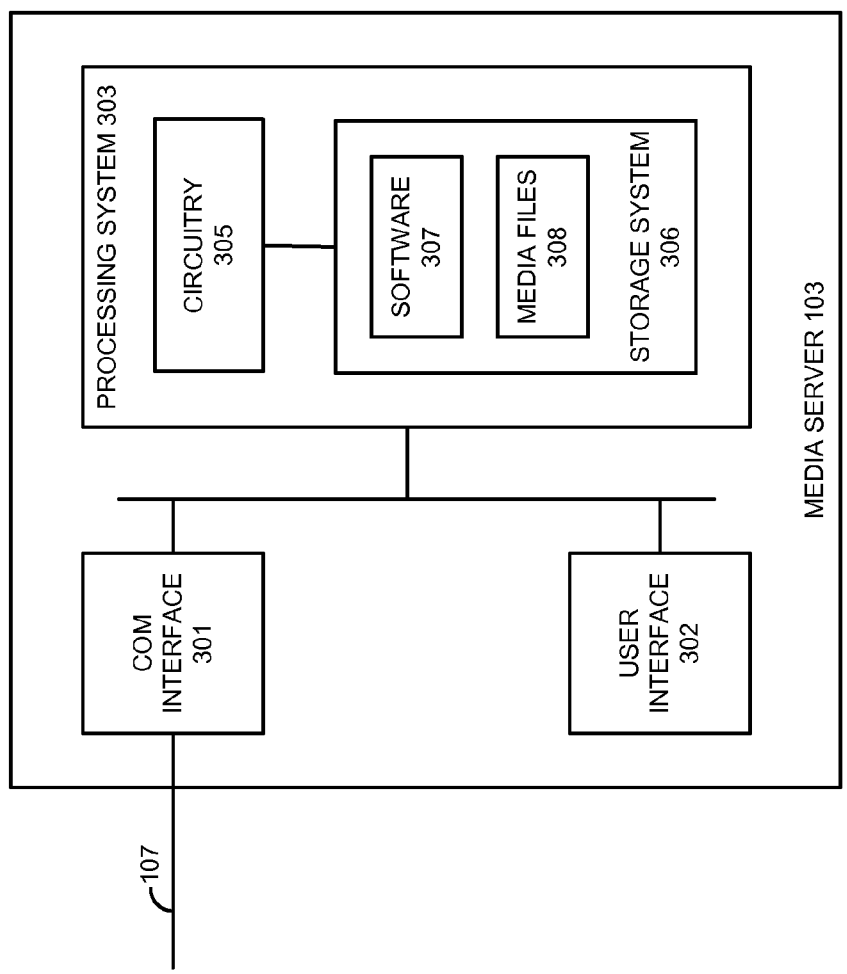
FIG. 3 is a block diagram that illustrates a media server.

FIG. 3 is a block diagram that illustrates media server 103. Media server 103 comprises communication interface 301, user interface 302, and processing system 303. Processing system 303 is linked to communication interface 301 and user interface 302. Processing system 303 includes circuitry 305 and storage system 306 that stores operating software 307 and media files 308. Media files 308 comprises video data, audio data, or some other type of media data.

Communication interface 301 comprises components that communicate over communication link 107 under the control of processing system 303. Communication interface 301 comprises a transceiver, network interface, or some other communication devices. User interface 302 may include a display, keyboard, buttons, touch pad, or some other user input/output apparatus. Circuitry 305 comprises microprocessor and other circuitry that retrieves and executes operating software 307 from storage system 306 to control communication interface 301 and user interface 302. Storage system 306 comprises disk drives, tape drives, flash drives, memory circuitry, or some other memory devices.

Operating software 307 comprises computer programs, firmware, or some other form of machine-readable processing instructions. Operating software 307 may include an operating system, utilities, drivers, network interfaces, applications, or some other type of software. When executed by circuitry 305, operating software 307 directs processing system 303 to operate media server 103 as described herein.

Figure 4:
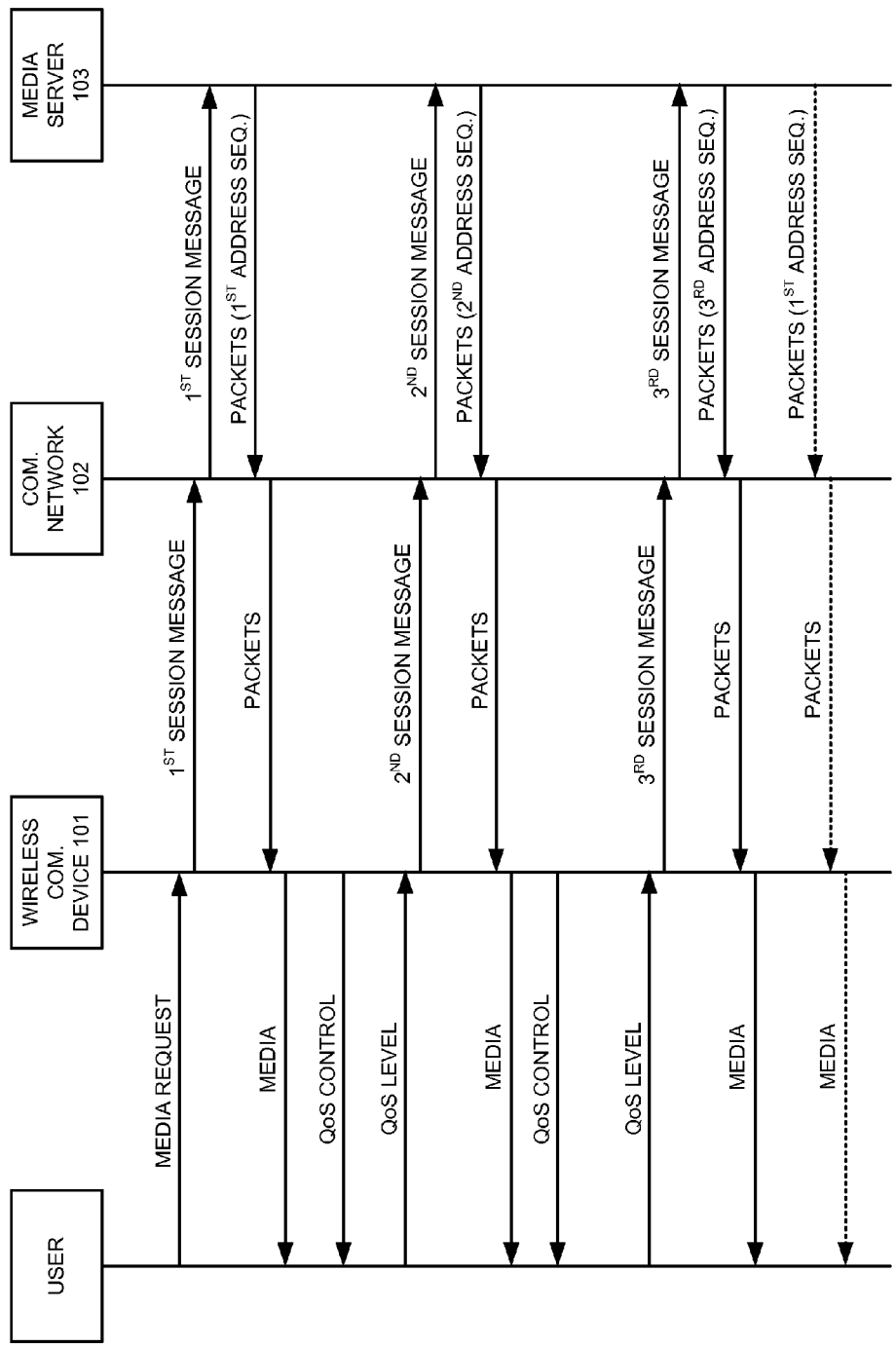
FIG. 4 is a sequence chart that illustrates the operation of the communication system.

FIG. 4 is a sequence chart that illustrates the operation of communication system 100. The user inputs a media request into wireless communication device 101, and in response, wireless communication device 101 wirelessly transfers a first session message to communication network 102. Communication network 102 transfers the first session message to media server 103. Media server 103 receives the first session message from communication network 102, and in response, media server 103 transfers the requested media to communication network 102 in a first set of media packets that each have a first sequence of packet addresses. Communication network 102 uses the first sequence of packet addresses to route the first set of media packets over communication path 111 to wireless communication device 101. Wireless communication device 101 wirelessly receives the first set of media packets from communication network 102 and displays the requested media to the user.

Wireless communication device 101 also displays a QoS control to the user. The user inputs a QoS level into wireless communication device 101 through the displayed QoS control. Wireless communication device 101 receives the QoS level, and in response, wirelessly transfers a second session message indicating the QoS level to communication network 102. Communication network 102 transfers the second session message to media server 103.

Media server 103 receives the second session message from communication network 102, and in response, translates the QoS level into a second sequence of packet addresses. Media server 103 then transfers the media to communication network 102 in a second set of media packets that each have the second sequence of packet addresses. Communication network 102 uses the second sequence of packet addresses to route the second set of media packets over communication path 112 to wireless communication device 101. Wireless communication device 101 wirelessly receives the second set of media packets from communication network 102 and displays the media to the user. Wireless communication device 101 also displays the Quality-of-Service (QoS) control to the user.

The user inputs another QoS level into wireless communication device 101 through the displayed QoS control. Wireless communication device 101 receives the other QoS level, and in response, wirelessly transfers a third session message indicating the other QoS level to communication network 102. Communication network 102 transfers the third session message to media server 103. Media server 103 receives the third session message from communication network 102, and in response, translates the other QoS level into a third sequence of packet addresses. Media server 103 then transfers media to communication network 102 in a third set of media packets that each have the third sequence of packet addresses. Communication network 102 uses the third sequence of packet addresses to route the third set of media packets over communication path 113 to wireless communication device 101. Wireless communication device 101 wirelessly receives the third set of media packets from communication network 102 and displays the media to the user.

In an alternative to the preceding paragraph (and indicated by dotted arrows on FIG. 4), media server 103 translates the other QoS level into the first sequence of packet addresses, and then transfers media to communication network 102 in a third set of media packets that each have the first sequence of packet addresses. Communication network 102 uses the first sequence of packet addresses to route the third set of media packets over communication path 111 to wireless communication device 101. Wireless communication device 101 wirelessly receives the third set of media packets from communication network 102 and displays the media to the user.

In the preceding examples, media server 103 may stop transferring media using the first packet addresses and then start transferring the media using the second packet addresses, or in the alternative, media server 103 may start transferring the media using the second packet addresses simultaneously with the transfer of media using the first packet addresses. Wireless communication device 101 would then simultaneously receive the media over separate packet streams. For example, wireless communication device 101 may receive a movie in simultaneous but separate packet streams and integrate the movie into a single media stream using media frame numbers.

In the preceding examples, media server 103 may stop transferring media using the second packet addresses and then start transferring the media using the third packet addresses. Alternatively, media server 103 may start transferring the media using the third packet addresses simultaneously with the transfer of media using the second packet addresses. Wireless communication device 101 would then simultaneously receive the media over separate packet streams.

Figure 5:
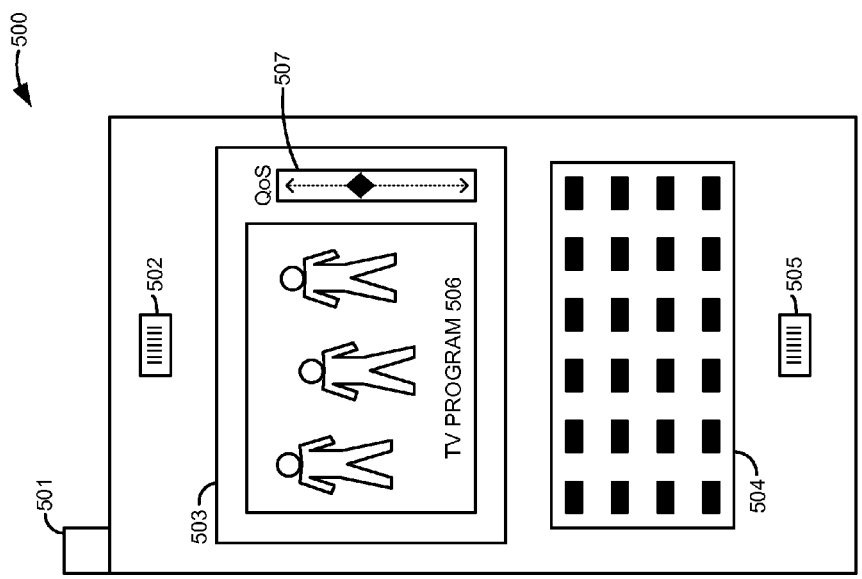
FIG. 5 is a sketch that illustrates a wireless communication device.

FIG. 5 is a sketch that illustrates wireless communication device 500. Wireless communication device 500 is one example of wireless device 101 described above, although other examples could be used. Wireless communication device 500 includes antenna 501, speaker 502, display screen 503, buttons 504, and microphone 505. Display screen 503 displays television program 506 and QoS control 507. QoS control 507 comprises a slide bar where the user operates buttons 504 to slide the indicator up and down the bar to respectively increase and decrease the QoS level for the delivery of television program 506. Wireless communication device 500 would allocate the location of the indicator on QoS control 507 to a range that is associated with a specific QoS level. Other graphical techniques for providing a QoS control that allows the user to specify the QoS level could be used.

FIG. 6 is a table diagram that illustrates the correlation between user-specified QoS levels and sequences of packet addresses. QoS level 1 uses the packet address sequence A-E-F-G-H. QoS level 2 uses the packet address sequence A-B-C-H. QoS level 3 uses the packet address sequence A-D-H. QoS level N uses the packet address sequence A-H. Media server 103 could use such a table to translate user specified QoS level into a sequence of packet addresses that will provide the QoS level.

Figure 7:
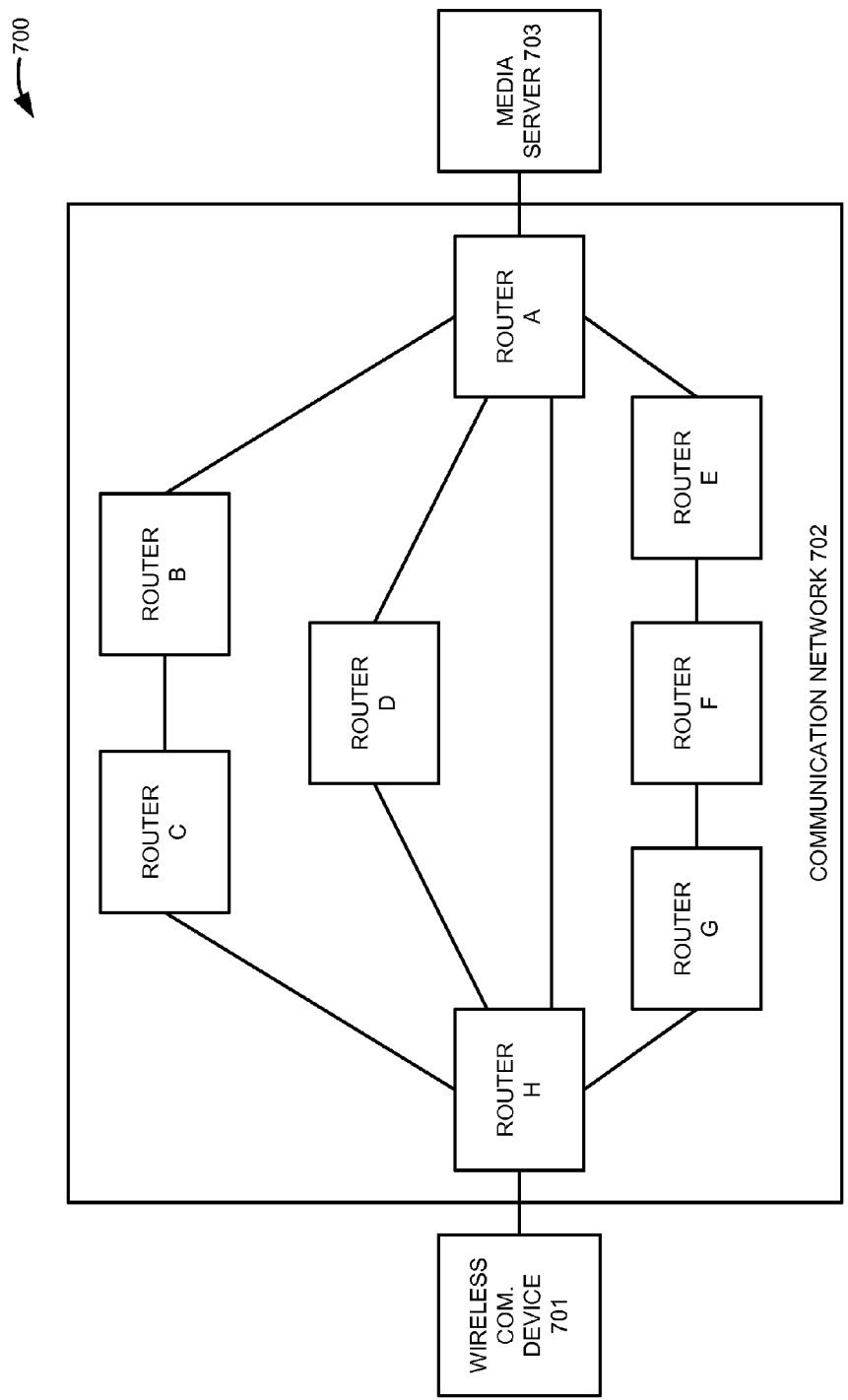
FIG. 7 is a block diagram that illustrates a communication system.

FIG. 7 is a block diagram that illustrates communication system 700. Communication system 700 comprises wireless communication device 701, communication network 702, and media server 703. Communication network 702 comprises routers A-H and various communication links. Media server 703 is linked to router A. Router A is linked to routers B, D, E, and H. Router B is linked to router C. Router C is linked to router H. Router D is linked to router H. Router E is linked to router F. Router F is linked to router G. Router G is linked to router H. Router H is linked to wireless communication device 701.

Communication network 702 routes media packets over different communication paths based on packet address sequences. These communication paths provide different QoS levels to the user. Thus, the correlation of QoS levels to packet address sequences (see FIG. 6) directs media transfer over a communication path with a QoS corresponding to the QoS specified by the user. Communication system 100 could use this technique.

If the user specifies QoS level 1, then media server 703 transfers the media to router A in packets having the address sequence A-E-F-G-H and the address for wireless communication device 701. The address sequence could reside in a single header or in a series of encapsulated headers. Router A removes address A (perhaps by moving it to the end of the sequence) and transfers the packets to router E based on the next address in the sequence. Router E removes address E and transfers the packets to router F based on the next address in the sequence. Router F removes address F and transfers the packets to router G based on the next address in the sequence. Router G removes address G and transfers the packets to router H based on the next address in the sequence. Router H removes address H and transfers the packets to wireless communication device 701 based on the next address in the sequence—that of wireless communication device 701.

If the user specifies QoS level 2, then media server 703 transfers the media to router A in packets having the address sequence A-B-C-H and the address for wireless communication device 701. Router A removes address A and transfers the packets to router B based on the next address in the sequence. Router B removes address B and transfers the packets to router C based on the next address in the sequence. Router C removes address C and transfers the packets to router H based on the next address in the sequence. Router H removes address H and transfers the packets to wireless communication device 701 based on the next address in the sequence—that of wireless communication device 701.

If the user specifies QoS level 3, then media server 703 transfers the media to router A in packets having the address sequence A-D-H and the address for wireless communication device 701. Router A removes address A and transfers the packets to router D based on the next address in the sequence. Router D removes address D and transfers the packets to router H based on the next address in the sequence. Router H removes address H and transfers the packets to wireless communication device 701 based on the next address in the sequence—that of wireless communication device 701.

If the user specifies QoS level N, then media server 703 transfers the media to router A in packets having the address sequence A-H-wireless communication device 701. Router A removes address A and transfers the packets to router H based on the next address in the sequence. Router H removes address H and transfers the packets to wireless communication device 701 based on the next address in the sequence—that of wireless communication device 701.

Media server 703 provides QoS information to wireless communication device 701. For example, media server 703 may transfer QoS levels and corresponding descriptions to wireless communication device 701 in the media packets. Wireless communication device 701 then displays the QoS information or uses the QoS information to drive the display of the QoS control. Alternatively, wireless communication device 701 may receive a QoS request from the user, and in response, wirelessly transfer a QoS query to media server 703 over communication network 702. Media server 702 receives the QoS query, and in response, transfers the QoS information to wireless communication device 701 over communication network 702. Wireless communication device 701 then displays the QoS information or uses the QoS information to drive the display of the QoS control.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, the method comprising:
   in a wireless communication device, receiving a media request from a user, and in response, wirelessly transferring a first session message to a communication network;
   in a media server, receiving the first session message from the communication network, and in response, transferring media to the communication network in a first set of media packets that each have a first sequence of packet addresses, wherein the communication network uses the first sequence of packet addresses to route the first set of media packets over a first communication path;
   in the wireless communication device, wirelessly receiving the first set of media packets from the communication network and displaying the media to the user, displaying a Quality-of-Service (QoS) control to the user, receiving a QoS level from the user through the QoS control, and in response, wirelessly transferring a second session message indicating the QoS level to the communication network;
   in the media server, receiving the second session message from the communication network, and in response, translating the QoS level into a second sequence of packet addresses and transferring the media to the communication network in a second set of media packets that each have the second sequence of packet addresses, wherein the communication network uses the second sequence of packet addresses to route the second set of media packets over a second communication path; and
   in the wireless communication device, wirelessly receiving the second set of media packets from the communication network and displaying the media to the user;
   receiving another QoS level from the user through the QoS control, and in response, wirelessly transferring a third session message indicating the other QoS level to the communication network;
   in the media server, receiving the third session message from the communication network, and in response, translating the other QoS level into a third sequence of packet addresses and transferring the media to the communication network in a third set of media packets that each have the third sequence of packet addresses, wherein the communication network uses the third sequence of packet addresses to route the third set of media packets over a third communication path; and
   in the wireless communication device, wirelessly receiving the third set of media packets from the communication network and displaying the media to the user.

2. The method of claim 1 wherein transferring the media from the media server to the communication network in the first set of media packets and the second set of media packets comprises simultaneously transferring the media to the communication network in the first set of media packets and the second set of media packets, and wherein wirelessly receiving the first set of media packets and the second set of media packets from the communication network in the wireless communication device comprises simultaneously receiving the first set of media packets and the second set of media packets.

3. The method of claim 1 wherein transferring the media from the media server to the communication network in the second set of media packets and the third set of media packets comprises simultaneously transferring the media to the communication network in the second set of media packets and the third set of media packets, and wherein wirelessly receiving the second set of media packets and the third set of media packets from the communication network in the wireless communication device comprises simultaneously receiving the second set of media packets and the third set of media packets.

4. The method of claim 1 wherein the media comprises video.

5. The method of claim 1 wherein the first communication path comprises a terrestrial path and the second communication path comprises an extra-terrestrial path.

6. The method of claim 1 wherein the first communication path comprises a wireless link and the second communication path comprises a landline link.

7. The method of claim 1 further comprising:
   in the wireless communication device, receiving a QoS request from the user, and in response, wirelessly transferring a QoS query to the communication network;
   in the media server, receiving the QoS query from the communication network, and in response, transferring QoS information to the communication network;
   in the wireless communication device, wirelessly receiving the QoS information from the communication network and wherein displaying the QoS control comprises displaying the QoS information.

8. The method of claim 1 further comprising:
   in the media server, transferring QoS information to the communication network in the first set of media packets; and
   wherein displaying the QoS control in the wireless communication device comprises displaying the QoS information.

9. A communication system comprising:
   a wireless communication device configured to receive a media request from a user, and in response, wirelessly transfer a first session message to a communication network;
   a media server configured to receive the first session message from the communication network, and in response, transfer media to the communication network in a first set of media packets that each have a first sequence of packet addresses, wherein the communication network uses the first sequence of packet addresses to route the first set of media packets over a first communication path;
   the wireless communication device configured to wirelessly receive the first set of media packets from the communication network and display the media to the user, display a Quality-of-Service (QoS) control to the user, receive a QoS level from the user through the QoS control, and in response, wirelessly transfer a second session message indicating the QoS level to the communication network;
   the media server configured to receive the second session message from the communication network, and in response, translate the QoS level into a second sequence of packet addresses and transfer the media to the communication network in a second set of media packets that each have the second sequence of packet addresses, wherein the communication network uses the second sequence of packet addresses to route the second set of media packets over a second communication path; and the wireless communication device configured to wirelessly receive the second set of media packets from the communication network and display the media to the user;

the wireless communication device is configured to receive another QoS level from the user through the QoS control, and in response, wirelessly transfer a third session message indicating the other QoS level to the communication network;

the media server is configured to receive the third session message from the communication network, and in response, translate the other QoS level into a third sequence of packet addresses and transfer the media to the communication network in a third set of media packets that each have the third sequence of packet addresses, wherein the communication network uses the third sequence of packet addresses to route the third set of media packets over a third communication path; and the wireless communication device is configured to wirelessly receive the third set of media packets from the communication network and display the media to the user.

10. The communication system of claim 9 the media server is configured to simultaneously transfer the media to the communication network in the first set of media packets and the second set of media packets, and the wireless communication device is configured to simultaneously receive the first set of media packets and the second set of media packets.

11. The communication system of claim 9 wherein the media server is configured to simultaneously transfer the media to the communication network in the second set of media packets and the third set of media packets and the wireless communication device is configured to simultaneously receive the second set of media packets and the third set of media packets.

12. The communication system of claim 9 wherein the media comprises video.

13. The communication system of claim 9 wherein the first communication path comprises a terrestrial path and the second communication path comprises an extra-terrestrial path.

14. The communication system of claim 9 wherein the first communication path comprises a wireless link and the second communication path comprises a landline link.

15. The communication system of claim 9 wherein:
the wireless communication device is configured to receive a QoS request from the user, and in response, wirelessly transfer a QoS query to the communication network;
the media server is configured to receive the QoS query from the communication network, and in response, transfer QoS information to the communication network;
the wireless communication device is configured to wirelessly receive the QoS information from the communication network and display the QoS control by displaying the QoS information.

16. The communication system of claim 9 wherein:
the media server is configured to transfer QoS information to the communication network in the first set of media packets; and
the wireless communication device is configured to display the QoS control by displaying the QoS information.

* * * * *